(12) United States Patent
Goldsmith

(10) Patent No.: US 6,405,161 B1
(45) Date of Patent: Jun. 11, 2002

(54) METHOD AND APPARATUS FOR LEARNING THE MORPHOLOGY OF A NATURAL LANGUAGE

(75) Inventor: John A. Goldsmith, Flossmoor, IL (US)

(73) Assignee: Arch Development Corporation, Chicago, IL (US)

( * ) Notice: Subject to any disclaimer, the term of this patent is extended or adjusted under 35 U.S.C. 154(b) by 0 days.

(21) Appl. No.: 09/360,822

(22) Filed: Jul. 26, 1999

(51) Int. Cl.[7] .............................................. G06F 17/27
(52) U.S. Cl. ......................................................... 704/9
(58) Field of Search .................. 704/1, 9, 10; 707/530, 707/531

(56) References Cited

U.S. PATENT DOCUMENTS

| | | | | |
|---|---|---|---|---|
| 5,559,693 A | * | 9/1996 | Anick et al. .................... | 704/9 |
| 5,708,829 A | * | 1/1998 | Kadashevich et al. ......... | 704/9 |
| 5,794,177 A | * | 8/1998 | Carus et al. .................... | 704/9 |
| 5,799,269 A | * | 8/1998 | Schabes et al. ................ | 704/9 |
| 5,835,888 A | * | 11/1998 | Kanevsky et al. ............. | 704/9 |
| 5,940,624 A | * | 8/1999 | Kadashevich et al. ......... | 704/9 |
| 5,963,893 A | * | 10/1999 | Halstead et al. ............... | 704/9 |

OTHER PUBLICATIONS

Kazakov, D., "Unsupervised Learning of Naïve Morphology with Genetic Algorithm" Workshop on Empirical Learning of Natural language Processing, Apr. 1997, pp. 105–112.*

* cited by examiner

Primary Examiner—Patrick N. Edouard
(74) Attorney, Agent, or Firm—Brinks Hofer Gilson & Lione

(57) ABSTRACT

A method and system (200) provide automatic and unsupervised morphological analysis of a corpus of a natural language. An optimal division of each word in the corpus is determined (104) and identified stems and suffixes are combined as signatures (106). Major patterns of stem allomorphy are identified (110) and a morphological analysis is produced (112) for subsequent processing.

6 Claims, 5 Drawing Sheets

METHOD AND APPARATUS FOR LEARNING THE MORPHOLOGY OF A NATURAL LANGUAGE

BACKGROUND OF THE INVENTION

The present invention relates generally to a method and apparatus for learning the morphology of a natural language. More particularly, the present invention relates to unsupervised acquisition, particularly using automatic means such as a computer, of the morphology of languages, particularly European languages.

The morphology of a language describes the structure of the words which form that language. The structure consists, generally, of stems or roots along with affixes such as prefixes and suffixes which modify the stem. Morphology involves collecting and organizing stems and associated affixes.

Development of morphologies of languages is a desirable goal. Previously, a morphology for a language has been developed by a trained linguist working manually to identify the appropriate stems and affixes and other structural features of a language. Such a project requires several man-weeks or more to accomplish. A better solution would involve unsupervised learning by automatic means, such as a programmed general purpose computer operating only on an input of a large corpus of a language.

Developing an unsupervised learner using raw text as its sole input offers several attractive aspects, both theoretical and practical. At its most theoretical, unsupervised learning constitutes a (partial) linguistic theory, producing a completely explicit relationship between data and analysis of that data. A tradition of considerable age in linguistic theory sees the ultimate justification of an analysis A of any single language L as residing in our ability to show that analysis A derives from a particular linguistic theory LT, and that LT works properly across a range of languages (that is, not just for language L).

The development of a fully automated morphology-generating tool would be of considerable interest. Good morphologies of many European languages are yet to be developed. With the advent of considerable historical text available online (such as the ARTFL data base of historical French), it is of great interest to develop morphologies of particular stages of a language. The language, and the process of automatic morphology-writing can simplify this process—where there are no native-speakers available—considerably. Such a system can also be used as a stemmer in the context of an information retrieval system, identifying stems, and multiplets of related stems.

A third motivation for developing such a system is that it can serve as a preparatory phase for an unsupervised grammar acquisition system. A significant proportion of the words in a large corpus can be assigned to categories, though the labels that are assigned by the morphological analysis are corpus-internal; nonetheless, the assignment of words into distinct morphologically motivated categories can be of great service to a syntax-acquisition device.

Development of language morphologies has value outside of purely linguistic endeavors. In many word processing programs, spell checking routines cannot properly recognize all forms of some words. As such routines are expanded to include new languages, the morphology of the new languages is necessary to efficiently implement the routine. The same is true of speech recognition routines.

There has been much less work done on automatic acquisition in the area of morphology than in the areas of syntactic analysis or part of speech tagging. Several researchers have explored the morphophonologies of natural language in the context of two level systems in the style of the model developed by Kimmo Koskenniemi [Koskenniemi, Kimmo,. Two-level Morphology: A General Computational Model for Word-form Recognition and Production, Publication no. 11, Department of General Linguistics, Helsinki, University of Helsinki, (1983)], Lauri Karttunen [Karttunen, Lauri. 1993. Finite State Constraints. In John Goldsmith (ed.), *The Last Phonological Rule,* pp. 173–194, Chicago, University of Chicago Press (1993)],M. R. Brent [Brent, M. R., Minimal Generative Models: A Middle Ground Between Neurons and triggers, in Proceedings of the 15th Annual Conference of the Cognitive Science Society, pages 28–36,Hillsdale, N.J., Lawrence Erlbaum Associates] and others. Morphophonology is the study of the changes in the realization of a given morpheme that are dependent on the context in which it appears. This is for the most part the problem of the treatment of regular allomorphy (also known as automatic morphophonology), that is, the treatment of the principles that determine how two surface-forms may be accounted for as the realization of a single string of characters, but subject to rules modifying those characters in particular contexts.

One closely related effort is that attributed to Andreev [Andreev, N. D. (editor) Statistiko-kombinatornoe modelirovanie iazykov, Moscow and Leningrad, Nauka (1965)] and discussed in Altmann and Lehfeldt [Altmann, Gabriel and Werner Lehfeldt, *Einführung in die Quantitative Phonologie,* Quantitative Linguistics vol. 7. Bochum, Studienverlag Dr. N. Brockmeyer (1980), esp. pp. 195ff)], though their description is limited and it does not facilitate comparison with the present approach. Dzeroski and Erjavec [Dzeroski, S. and T. Terjavec. 1997, Induction of Slovene nominal paradigms, in Nada Lavrac, Saso Dzeroski (eds.): Inductive Logic Programming, 7th International Workshop, ILP-97, Prague, Czech Republic, Sep. 17–20, 1997, Proceedings, Lecture Notes in Computer Science, Vol. 1297, Springer, 1997. Pp. 17–20. (1997)] report on work that they have done on Slovene, a south Slavic language with a complex morphology, in the context of a similar project. Their goal essentially was to see if an inductive logic program could infer the principles of Slovene morphology to the point where it could correctly predict the nominative singular form of a word if it were given an oblique (non-nominative) form. Their project apparently shares with the present invention the requirement that the automatic learning algorithm be responsible for the decision as to which letters constitute the stem and which are part of the suffix (es), though the details offered by Szeroski and Erjavec are sketchy as to how this accomplished. The learning algorithm is presented with a labeled pair of words—a base form, and an inflected form. It is not clear from their description whether the base form that they supply is a surface form from a particular point in the inflectional paradigm (the nominative singular), or a more articulated underlying representation in a generative linguistic sense; the former appears to be their policy.

Szeroski and Erjavec's goal is the development of rules couched in traditional linguistic terms; the categories of analysis used to label and used in the analysis are decided upon ahead of time by the programmer (or more specifically the tagger of the corpus), and each individual word is identified with regard to what morphosyntactic features it bears. The form bolecina is marked, for example, as a feminine noun singular genitive.

In some respects, the problem in the present application is akin to the problem of word-breaking in Asian languages, a problem that has been tackled by a wide range of researchers. From the current perspective, the most interesting attempt is that provided by de Marcken [de Marcken, Carl. 1995. *Unsupervised Language Acquisition,* Ph.D. dissertation, MIT (1995)], which describes an unsupervised learning algorithm for the development of a lexicon that de Marcken applies to a written corpus of Chinese, as well as to written and spoken corpora of English (the English text has had the spaces between words removed). A Minimal Description Length (MDL) framework is employed [Rissanen, Jorma. *Stochastic Complexity in Statistical Inquiry.* World Scientific Publishing Co.(1989)], and reports excellent results. The algorithm begins by taking all individual characters to be the baseline lexicon, and it successively adds items to the lexicon if the items will be useful in creating a better compression of the corpus in question. In general, a lexical item of frequency F can be associated with a compressed length of $-\log_2 F$, and de Marcken's algorithm computes the compressed length of the Viterbi-best parse of the corpus. The compressed length of the whole is the sum of the compressed lengths of the individual words (or hypothesized chunks) plus that of the lexicon. In general, the addition of chunks to the lexicon (beginning with such high frequency items as "th") will improve the compression of the corpus as a whole, and de Marcken shows that successive iterations add successively larger pieces to the lexicon.

Applying de Marcken's algorithm to a corpus of a language such as English from which the white space has not been removed provides interesting results, and what it provides is essentially an excellent system of compressing words of the language in question. However, the results are too uncontrolled linguistically since they do not correspond well to the linguist's morphemes, and they do not provide much knowledge about the present problem of morphology extraction. In particular, the morphology task is especially interested in the cooccurrence relationships between stem and affix, while de Marcken's MDL based approach specifically eschews such matters. In addition, it was not designed to speak to the question of stem allomorphy.

The present application is particularly addressed to the stem-suffix structure possessed by most words in Indo-European languages, which is to say that the stems and inflectional suffixes will generally always appear in words of no more than two morphemes (i.e., of the form stem+affix). Languages such as Hungarian and Finnish do not have this characteristic. The average number of morphemes per word is considerably greater than 2, and identification of the morphological system cannot be bootstrapped in such languages from the occurrences of stems and suffixes found in words of two morphemes.

De Marcken's MDL-based figure of merit for the analysis of a substring of the corpus is the sum of the inverse log frequencies of the components of the string in question. The best analysis is that which minimizes that number (which is the theoretical length of the compressed form of that substring). One might try using this figure of merit on words in English constrained to allowing analysis of all words into exactly two pieces. The results are of no interest, however. Words will always be divided into two pieces where one of the pieces is the first or the last letter of the word, since individual letters are so much more common than morphemes.

Accordingly, there is a need for a method and apparatus for automatically learning the morphology of a natural language.

BRIEF SUMMARY OF THE INVENTION

An apparatus and method in accordance with the present invention provide automatic and unsupervised morphological analysis of a natural language. Prefixes, suffixes and stems of the language in question are determined, along with regular patterns of suffixation. In addition, major patterns of stem allomorphy are determined.

The method and apparatus divide naturally into three subareas. First is the determination of the correct morphological split for individual words. Second is the establishment of accurate categories of stems based on the range of suffixes that they accept. Third is the identification of allomorphs of the same stem—so-called irregular stems. Each of these is considered in more detail.

1. Splitting words: The goal is to accurately analyze any word into successive morphemes in a fashion that corresponds to the traditional linguistic analysis. Minimally, the system identifies the stem, as opposed to any inflectional suffixes. Ideally, the system also identifies all the inflectional suffixes on a word which contains a stem that is followed by two or more inflectional suffixes, as well as identifying derivational prefixes and suffixes. The system indicates that in this corpus, the most important suffixes are -s, -ing, -ed, and so forth, while in the next corpus, the most important suffixes are -e, -en, -heit, -ig, and so on. Of course, the system is not a language identification program, so it will not name the first as "English" and the second as "German," but it will perform the task of deciding for each word what is stem and what is affix.

2. Range of suffixes: The most salient characteristic of a stem in the languages considered here is the range of suffixes with which it can appear. Adjectives in English, for example, will appear with some subset of the suffixes—er/-est/-ity/-ness, etc. The system determines automatically what the range of the most regular suffix groups is for the language in question, and ranks suffix groupings by order of frequency in the corpus.

3. Stem allomorphy: All languages exhibit allomorphy—that is, cases of distinct stems that should be identified as corresponding to a single lemma. In a few cases, the stem allomorphy is radically replacive, as in the past stem went for the English verb go. Such extreme cases typically arise from the collapsing of two distinct words in the history of a language, as was the case in this example, for English has indeed taken the past form of the verb wend and assigned it to the verb go. Much more common is stem allomorphy based on regular or semi-regular patterns. In English, many cases of this exist in the verbal systems going back thousands of years to Indo-European alternations, as in sing/sang or catch/caught. Since the present system is concerned exclusively with written text, we can include in this category the stem allomorphy found in stems with short vowels: hem/hemm, say, as in hem/hem-s/hemm-ed/hemm-ing. In Spanish, many verbs have two stems, one with a simple vowel when the stress falls on the suffix, and one with a diphthong when stress falls on the stem (duerm/dorm 'sleep'); in German, many lemmas have an umlauted and an non-umlauted form (Haus-/Häus 'house', used in the singular and the plural forms, respectively). An automatic morphological analyzer should identify such regular and semi-regular patterns as much as possible, though identification of completely suppletive forms is impossible if one does not take higher-order syntactic information into account.

DETAILED DESCRIPTION OF THE INVENTION

Figure 1:
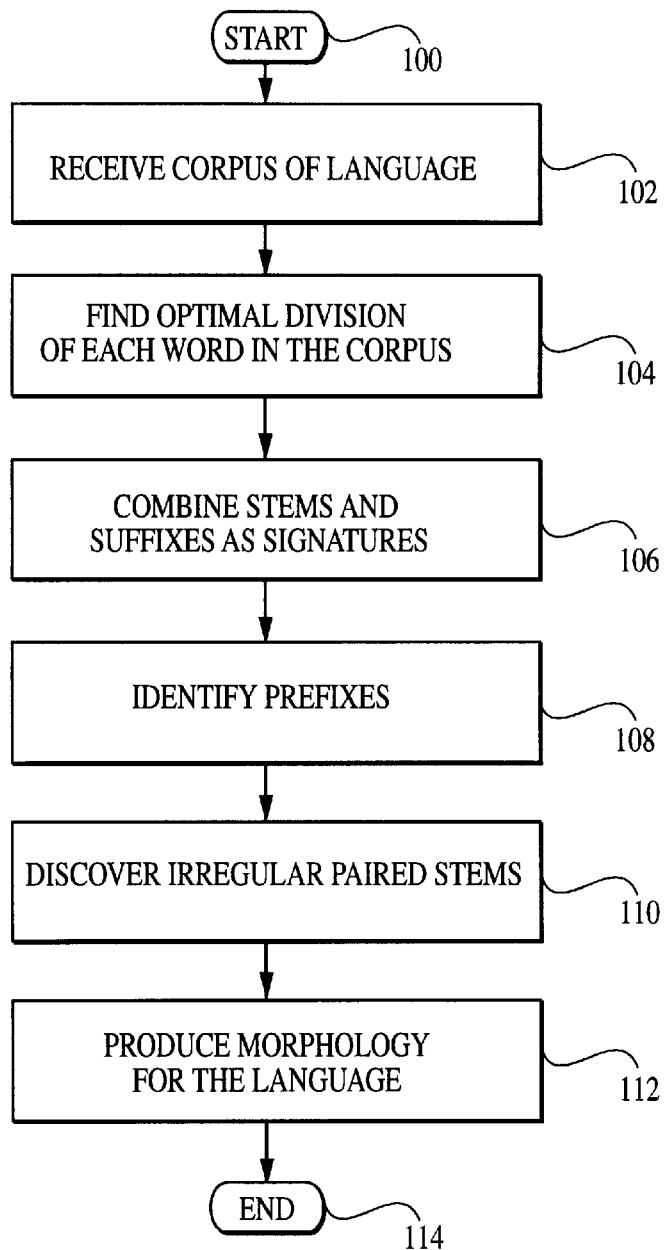
FIG. 1 is a flow diagram illustrating a method for learning the morphology of a natural language.

Referring now to the drawing, FIG. 1 is a flow diagram illustrating one embodiment of a method for learning the morphology of a natural language. The method begins at step 100. In one embodiment, the method is implemented as a computer program operating on a general purpose data processing apparatus, such as a personal computer.

At step 102, a corpus of the language is received for subsequent processing. Preferably, the corpus is a text file of 50,000 to 1 million words in the language of choice. Satisfactory results may be obtained using a corpus as small as 5,000 words. The language may be any suitable language, particularly a European language and most particularly an Indo-European language. Examples of suitable languages are English, French, German, Spanish, Italian, Dutch and Russian. The corpus is provided as an input file to the computer program embodying the method.

The method continues at step 104, which is a step of finding an optimal division of each word of a plurality of words of the corpus to form stems and suffixes. The method begins analysis by seeking or imposing an initial parsing of all words of two or more letters into two pieces, referred to as stem and suffix. Initially, the significance of those terms is simply that all words are divided into two pieces, and the stem precedes the suffix. From a purely terminological point of view, the stem could be designated as the prefix and all words could be described as being composed of a prefix followed by a suffix. However, these elements share common concepts with the traditional notions of stem and suffix and the units labeled here as stem will become identified with what are traditionally called stems in linguistics.

Step 104 of the method, then, seeks an optimal division of each word into stem and suffix. An optimal division can readily be defined in particular cases. For example, audacity should be parsed as audac+ity, because we can refer to the related words audacious and the range of words ending in ity (sanity, obesity, paucity, etc.). In the case of a word such as stomach, on the other hand, no particular parsing of any use from a morphological point of view: stom+ach (or any other parsing) provides us with a link to other words. Other issues arise, for example, in the case of words such as the, this, that, those. In one parsing of these words, th is seen as a morpheme.

The clearest case of all is words like taller (=tall+er) and fights (=fight+s), since there are other uses of the form tall and fight, as when the words appear in free-standing form, or in the forms tallest, fighting, etc. Only slightly less clear are cases like likes, which might best be divided as like+s, but which might be parsed as lik+es, on the grounds that liking should be brought into alignment with like and likes. In the overwhelming majority of cases, it is clear what parsing linguists would like the algorithm to produce. Further detail on optimal parsing of words in the corpus will be provided below in conjunction with FIG. 3 and FIG. 7.

The method continues at step 106. There, stems and suffixes identified in step 104 are combined as signatures. For each stem identified in step 104, the method makes a list of those suffixes that appear with the stem. In the illustrated embodiment, an alphabetized list of such suffixes, separated by an arbitrary symbols such as a period or hyphen, is called the stem's signature. The signature may be thought of as a paradigm. For example, in one English corpus, the stems despair, pity, appeal, insult appear with the suffixes ing and ingly. However, they also appear as free-standing words, and so we indicate that with the word "NULL", to indicate a zero suffix. Thus their signature is NULL.ing.ingly. Similarly, the stems assist and ignor [sic] are assigned the signature ance.ant.ed.ing in a certain corpus. Greater detail on defining signatures will be provided below in conjunction with FIG. 4.

At step 108, prefixes are identified in the list of stems and suffixes. In one embodiment, a technique similar to that used to identify stems and suffixes may be used to identify prefixes. Further detail will be provided below in conjunction with FIG. 5.

At step 110, irregular paired stems are located in the corpus and added to the morphology for the language. Such stems are examples of stem allomorphy, or distinct stems that should be linguistically combined. Examples are run and ran and decid and decis. Further detail on the identification of such stem allomorphs will be provided below in conjunction with FIG. 6.

At step 112, the morphology of the language is produced. The output may be in the form of data for storage in a suitable storage medium or may be displayed on a device such as a computer monitor or may be printed for hard copy output from a printer. The output may be combined with other data for presentation of the results of the analysis. In one embodiment, the output includes a list of all signatures identified by the system using as input the corpus of the language.

Figure 2:
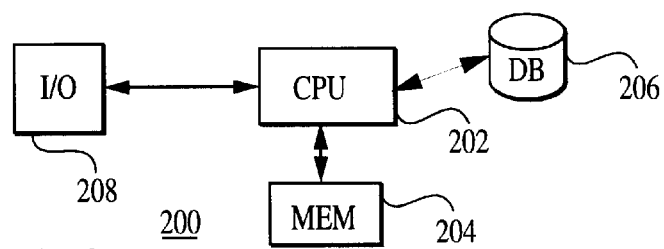
FIG. 2 is a block diagram of a general purpose computer system suitable for implementing the method of FIG. 1.

FIG. 2 shows an exemplary embodiment of a system 200 for implementing the method of FIG. 1 to learn the morphology of a natural language. The system 200 is a computer and may be any general purpose computer system. The system 200 includes a central processing unit (CPU) 202, a memory 204, a database 206 and input/output device 208. The CPU 202 operates in response to programs of instructions and data stored in the memory 204 and the database 206. The input/output device 208 includes a keyboard, a monitor for visual display and an attached printer.

In one exemplary embodiment, the method and apparatus have been coded in C++ for operation on a desktop personal computer running a version of the Windows operating system available from Microsoft. The CPU 202 in this embodiment is a Pentium II microprocessor from Intel running at a clock rate of 333 MHz.

Figure 3:
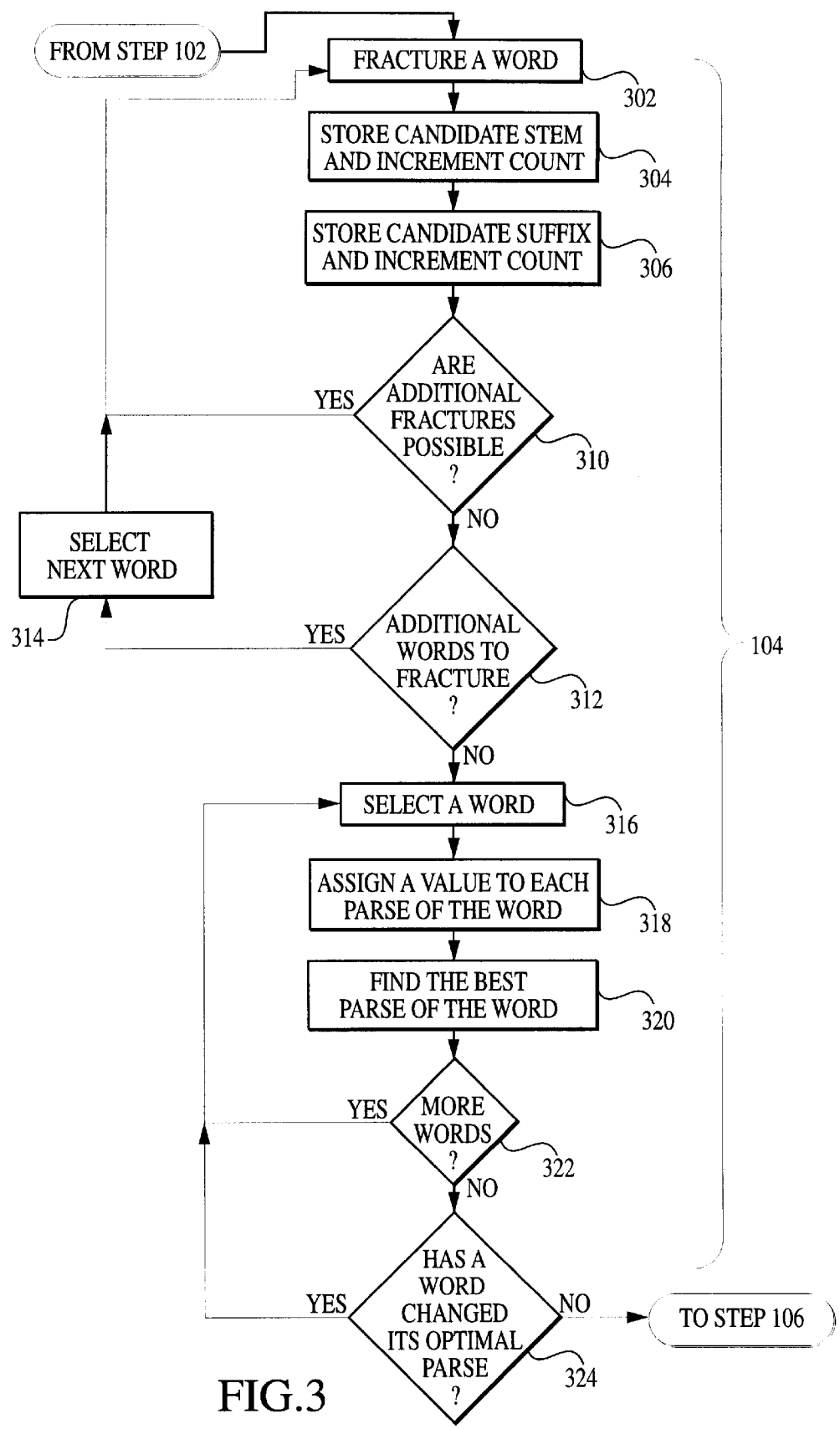
FIGS. 3–6 are flow diagrams illustrating in greater detail portions of the method illustrated in FIG. 1.

FIG. 3 illustrates in greater detail the step of finding an optimal division of each word in the corpus (step 104, FIG. 1). The steps illustrated in FIG. 3 illustrate a process of dividing each word of the corpus into all possible combinations, each combination having two elements; for each possible combination, storing a candidate stem and a candidate suffix; and for each candidate stem and each candidate suffix, assigning a value related to the number of occurrences of the candidate stem and the candidate suffix in the words of the corpus. This process will be described in further detail.

The steps of FIG. 3 establish a lexicon for the corpus, associating with each word the (absolute) frequency, i.e., the number of times it has occurred in the corpus. The notation [W] is used to indicate the number of times the word W occurs in the corpus. <W> indicates W's frequency, that is, |W| divided by the total number of word tokens in the corpus. In addition, I will use <<W>> to indicate $-1*\log <W>$. |W| indicates the length of W in letters.

At step 302, a word in the corpus is selected and fractured. In the preferred embodiment, each word is iteratively fractured into all possible two-element combinations. Thus the word table is fractured into t+able; ta+ble; tab+le; and tabl+e. Each possible fracture consists of a candidate stem (such as t) and a candidate suffix (such as able). For each fracture, at step 304 the candidate stem is stored and a count value is incremented. Similarly, at step 306 the candidate suffix is stored and a second count value is incremented. Control remains in a loop including steps 302, 304, 306 and 308 until all possible fractures of a word are obtained. After a word is fully fractured, at step 312 it is determined if there are additional words in the corpus to be fractured. If so, at step 314 a next word is selected and the fracturing process resumes for the next word. Otherwise, control proceeds to step 316.

To find an optimal division of each word in the corpus requires a figure of merit for each of the possible parses of a word W. The figure of merit reflects the fact that a hypothetical stem S is a good candidate as a stem if and only if S is a good candidate as a stem in many other words as well, and likewise for suffixes. This observation leads to the best parse iteratively, in the following way.

On the first pass through the lexicon, the system considers all possible parses of each word W as equally likely. Since in general there are |W|−1 ways to parse a word of |W| letters (i.e., 7 ways to split a word of 8 letters), this means that each stem is assigned an occurrence of |W|/([W]−1) by virtue of appearing in word W. For example, if the word table appears 20 times in the corpus, the stem t is assigned 5 occurrences, as are the stems ta, tabs and tabl. The same holds for the suffixes able, ble, le, and e, which are stored in the Suffix structure.

The system performs this counting operation on all the words in the lexicon. Thus, at step 316, the system selects a word from the corpus. At step 318, the system assigns a value to each parse of the word. On successive passes, we evaluate the goodness of a parse by means of the measure (1) $V(\text{Stem/Suffix}) = |\text{Stem}|*\log[\text{Stem}] + |\text{Suffix}|*\log[\text{Suffix}]$.

Using the frequency values established on the previous iteration, for each word, we consider all possible parses, and assign a value to each parse by the V function in (1). Having computed the V function for all |W|−1 parses; we distribute [W] among the parses in a linear fashion based on V. That is, if for a fixed word W of length 7 letters, V* is the sum over all parses $P_i$ of $V(P_i)$, and if Stem(3) is the first 3 letters of word W and Suffix(4) its last 4 letters, then Stem(3) (and also Suffix(4)) is assigned a certain portion of W's occurrences (that stem and that suffix will, of course, occur inside of other words in the lexicon as well); that portion is just [W]*V(Stem(3)-Suffix(4)), that is:

(1) $[W]*(|Stem(3)|*\log[Stem(3)] + |Suffix(4)|*\log[Suffix(4)])$

For each word, we note what the best parse is, step 320. That is, which parse has the highest rating by virtue of the V-function. We iterate, step 322, until no word changes its optimal parse, step 324. Empirically, this requires typically fewer than 5 iterations on the entire lexicon.

The system now has an initial split of all words into stem plus suffix. Even for words like this and stomach the system has such an initial split. The task now is to decide which splits are worth keeping, which ones need to be dropped, and which ones need to be modified. In addition, the system has many splits which are splits between prefix and stem: words beginning with de (defense, demand, delete, etc.) will at this point all be split after the initial de.

Figure 4:
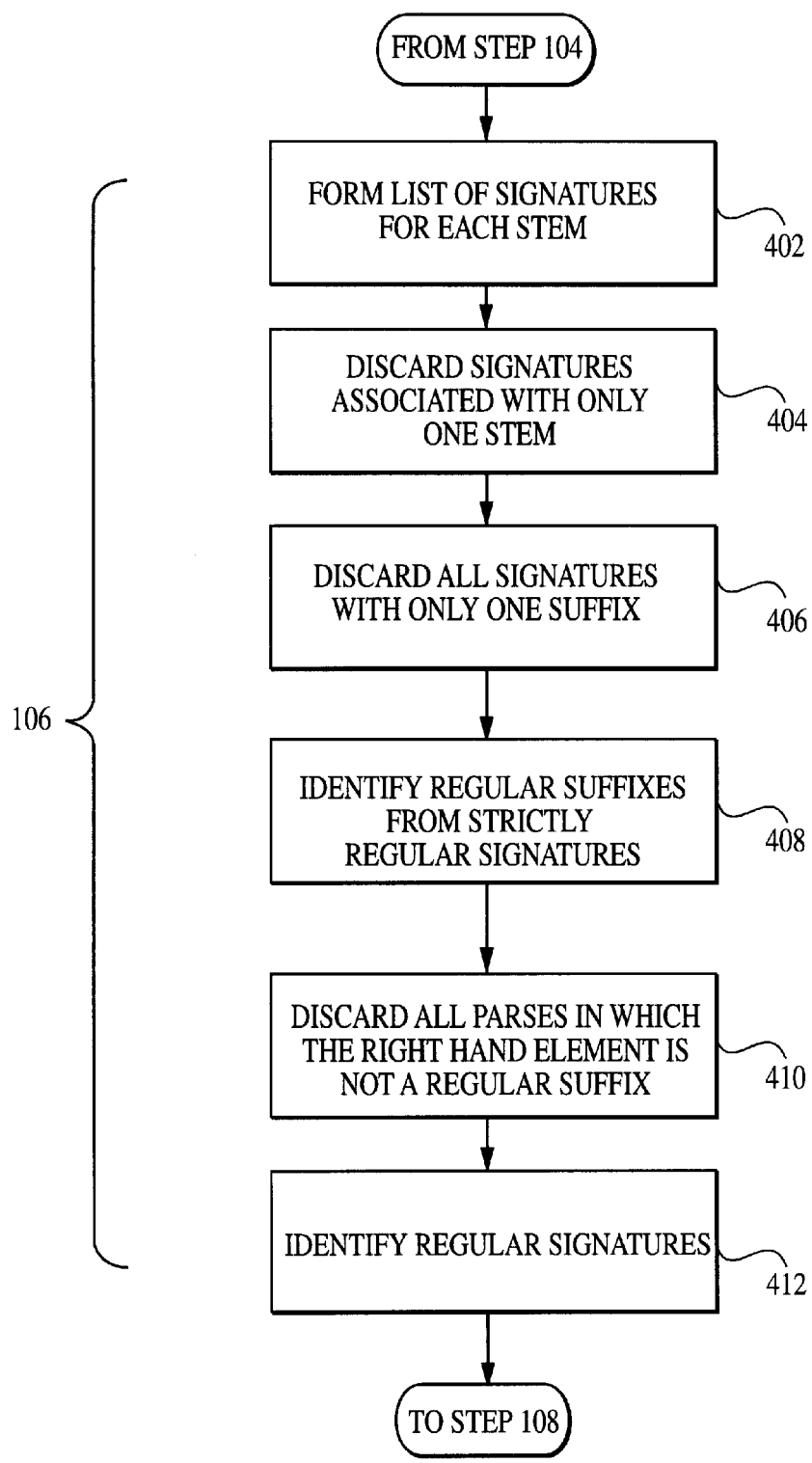

FIG. 4 illustrates in greater detail step 106 of FIG. 1. In the steps of FIG. 4, the stems and suffixes identified in step 104 are combined to form signatures.

Each word now has an optimal split into stem and suffix. The system henceforth considers only the best parse for that word, and retain only those stems and suffixes that were optimal for at least one word. For each stem, the system makes a list, step 402, of those suffixes that appear with it. The alphabetized list of such suffixes (separated by an arbitrary symbol, such as period or hyphen) is called the stem's signature. As an example, in one English corpus, the stems despair, pity, appeal, insult appear with the suffixes ing and ingly. However, they also appear as free-standing words. That is indicated that with the word "NULL", to indicate a zero suffix. Thus their signature is NULL.ing.ingly. Similarly, the stems assist and ignor [sic] are assigned the signature ance.ant.ed.ing in a certain corpus.

The system establishes a data structure of all signatures, keeping track for each signature of which stems are associated with that signature. In the illustrative embodiment of FIG. 2, for example, the processing of each stem and suffix is performed by CPU 202 and resultant data such as the signatures is stored in the database 206 or the memory 204. As an initial heuristic, subject to correction below, the system discards all signatures that are associated with only one stem, step 404, and all signatures with only one suffix, step 406. The remaining signatures we shall call strictly regular signatures, and we will call all of the suffixes that we find in them the regular suffixes. In one representative 100,000 word corpus of English, for example, 1,693 signatures were identified in this way. Of these, 145 were strictly regular signatures. The rest were composed of signatures with either one suffix or one stem. The regular suffixes are not quite the suffixes a linguist would establish for the language, but they are a very good approximation, and constitute a good start.

In step 408, regular suffixes of the language are identified from strictly regular signatures. The strictly regular signatures are thus those that specify exactly the entire set of suffixes used by at least two stems in the corpus. If there exists a morphological pattern of 5 suffixes, for example, and there is a large set of stems that appear with all 5 suffixes, then that set will give rise to a regular signature with 5 suffixal members. This simple pattern may be perturbed by the extraneous fact that one of the stems also appears with some other suffix. If all stems that associate with these 5 suffixes appear with idiosyncratic suffixes (i.e., each different from the others), then the signature of those 5 suffixes will never emerge.

Once the system has determined the regular suffixes of the language, the entire lexicon is reanalyzed. On this pass, only those splits of each word in which the right-hand element is a regular suffix are permitted, step 410.

A sense of what are identified as strictly regular signatures in familiar languages on may be obtained using the 1,000,000 word Brown corpus. The signatures have been ordered in Table 1 (English) by the "breadth" of a signature, which is defined as the number of stems times the number of suffixes corresponding to the signature, counting by type, not token. These signatures are easy to identify: among the top 10 signatures, numbers 1, 2, 3, 8, 9, 10 (1: NULL.ed.ing.s; 2: e.ed.es.ing.s.; 3: NULL.ed.ing.; 8: ed.es.ing; 9: NULL.ed.es.ing.; 10: NULL.ed.s, and some of 4: NULL.s) are clearly verbal, while #7 NULL.ly.ness) is clearly adjectival, and #5 and 6 ('s.NULL, 's.NULL.s.) are clearly nominal. One can determine by inspection that all of these signatures are legitimate morphological mini-categories.

TABLE 1

Signatures in the Brown 1 million word corpus of English

| Rank | Signature | Type count | Token count |
|---|---|---|---|
| 1 | .NULL.ed.ing.s. | 96 | 5964 |
| 2 | .e.ed.es.ing. | 53 | 7007 |
| 3 | .NULL.ed.ing. | 112 | 2769 |
| 4 | .NULL.s. | 961 | 14731 |
| 5 | .'s.NULL. | 863 | 24766 |
| 6 | .'s.NULL.s. | 69 | 2750 |
| 7 | .NULL.ly.ness. | 64 | 2886 |
| 8 | .ed.es.ing. | 59 | 1665 |
| 9 | .NULL.ed.es.ing. | 21 | 1212 |
| 10 | .NULL.ed.s. | 44 | 1526 |

The remaining signatures contain much that is of no interest, such as the signature "ch.e.erial.erials.rimony.rons.uring" and the signature "el.ezed.nce.reupon.ther", each of which corresponds to exactly one "stem" whose identity is not difficult to determine. These signatures are discarded However, that set of signatures also contains much that is informative about the co-occurrences of the regular suffixes.

Therefore, consideration of signatures from the strictly regular signatures is expanded to a larger class, referred to simply as the regular signatures of the language. This is the class of all signatures derived solely from the regular suffixes containing two or more suffixes.

The regular signatures may be defined in another way. Consider only that part of the vocabulary for which the stem/suffix split results in a suffix that is in the set of regular suffixes; from that sub-vocabulary, build all of the signatures using the algorithm already described. The resulting signatures are the regular signatures. Discard those signatures consisting of only a single suffix. Those singletons are discarded because they consist of cases where plausibly a stem has been identified, but the stem does not appear in any other form in the corpus. Actually, the identification of stems whose signature is, in this sense, a singleton is potentially valuable, despite the fact that factorization of this word is uncertain. For example, in one corpus, both subconscious and simp occur with the suffix -ly. While the latter stem, is of no interest, the stem subconscious is useful in the determination of prefixes, for the presence of the stem conscious will contribute to allowing us to infer that sub is a prefix.

In one typical English corpus of 100,000 words, 137 strictly regular signatures were found. More than three times as many—439—regular signatures were found. The strictly regular signatures do not look particularly more reliable or real than the other regular signatures. For example, the signature .NULL.es.ful.fully.ion. appeared with only one stem (success) in one particular 100,000 word English corpus, but it is composed of quite regular suffixes, which might well be associated with more than one stem in another corpus.

Turning to a French example, the top 10 signatures that we find in a 1,000,000 corpus are given in Table 2.

TABLE 2

Signatures in a 1,000,000 word corpus of French

| Rank | Signature | Type count | Token count |
|---|---|---|---|
| 1 | .NULL.e.es.s. | 50 | 4833 |
| 2 | .NULL.s. | 1551 | 31080 |
| 3 | .NULL.e.s. | 38 | 482 |
| 4 | .NULL.e.es. | 38 | 2610 |

TABLE 2-continued

Signatures in a 1,000,000 word corpus of French

| Rank | Signature | Type count | Token count |
|---|---|---|---|
| 5 | .l.lle.lles.ls. | 17 | 846 |
| 6 | .NULL.es.s | 34 | 2631 |
| 7 | .i.ie.ir.is.it. | 10 | 610 |
| 8 | .ien.ienne.iennes.iens. | 13 | 215 |
| 9 | .NULL.e.ement.es.s. | 9 | 1664 |
| 10 | .l.le.ux. | 25 | 867 |

The first signature identifies regular adjectives, appearing in masculine, feminine, feminine plural, and masculine plural forms, while the third, fourth, and six signatures identify other adjectives that accidentally show up with only a subset of their possible forms. The ninth signature extends that group to adjectives taking the adverb-forming suffix -ment. The second signature identifies primarily nouns, but a handful of adjectives that appear in just the singular and plural form with the same gender. Signature 5 contains stems ending with the morphemes -el (17 of them). Signature 7 identifies verbs in the second (-ir) conjugation. Signature 8 identifies a class of toponymic forms (both nominal and adjectival), Finally, signature 10 identifies stems ending in the adjectival suffix -al, -ale, and -aux, such as inéga[l]: inégal, inégale, inégaux (unequal, masculine singular, feminine singular and masculine plural). The initial α is incorrectly assigned to the stem in these cases, not the suffixes.

From 1,000,000 words of Italian, we find the top signatures in Table 3.

TABLE 3

Signatures in a 1,000,000 word corpus of Italian

| Rank | Signature | Type count | Token count |
|---|---|---|---|
| 1 | .a.e.i.o. | 136 | 7126 |
| 2 | .ica.iche.ici.ico | 43 | 2942 |
| 3 | .a.i.o. | 114 | 1616 |
| 4 | .ia.ica.iche.ici.ico.ie. | 13 | 767 |
| 5 | .a.ando.ano.are.ata.ate.at i.ato.azione.o. | 7 | 746 |
| 6 | .e.i. | 583 | 10925 |
| 7 | .a.e.i. | 47 | 1573 |
| 8 | .i.o. | 383 | 4848 |
| 9 | .a.e.o. | 32 | 513 |
| 10 | .a.e. | 236 | 4142 |

Signature 1 is formed from adjectival stems in the feminine singular, feminine plural, masculine plural and masculine singular forms. Signature 2 is entirely parallel, based on stems ending with the morpheme -ic/-ich, where ich is used before i and e. Signature 4 is an extension of Signature 2, including nominalized (singular and plural) forms. Signature 5 is the large regular verb inflection pattern. Seven such verb stems are identified. Signature 3 is a subset of signature 1, composed of stems accidentally not found in the feminine plural form. Signatures 6 and 8 are primarily masculine nouns, singular and plural. Signature 10 is feminine nouns, singular and plural. The remaining Signatures 7 and 9 are again subsets of the regular adjective pattern of Signature 1.

In the lists in each of these languages and others as well, many of the signatures are unobjectionable, but many are not quite perfect. The problems break into certain categories. In one category, all suffixes in a signature begin with a common letter (or series of letters) that should be part of the stems in question. For example, the signature .t.ted.tion.ts. ought, in some fashion, to be reanalyzed as NULL.ed.ion.s., with a t replaced into the stem (a stem in question is defec). In a second category, all of the suffixes in a signature begin with a common morpheme (er.ers, ment.ments) which should be analyzed as a separate morpheme, in between stem and true suffix. Third, when a stem-final consonant should "delete" in front of a suffix (take/taken/taking), a signature is obtained with a non-null element—the e—where we might rather have a NULL. The last category evidences stem allomorphy. For example, we find both the stems accompani and accompany in the analysis of the 1,000,000 Brown corpus. Ideally, the analysis should provide an indication that these two stems are related to each other.

The first effort to collapse signatures is also an effort to identify and correct for incorrect word/stem splits that result from putting too much material in the suffixes. Consider a list of regular signatures in Table 4.

TABLE 4

Hypothetical signatures with too much information.

ment.ments.
e.e's.
ful.fully.
er.ered.
e.es.
ent.ently.
ing.ings.
ion.ions.
ous.ously.
ing.ingly.
er.er's.ers
t.ty.
our.ours.
t.ted.ts.
er.er's.
ow.ouw.
ect.ected.
on.ons.
ish.ished.
t.ted.
et.ets.
er.ers.
tt.ts.
ay.ays.
ate.ately.
er.ered.ers.
tion.tions.

In all of these cases, there is too much material that has been segregated into the suffix. In some cases, the suffix should be recognized as really being two suffixes, whereas in other cases, material should be replaced in the stem. For present purposes, these two cases collapse together, because in placing material back in the stem, it will be analyzed again at a later stage when the stem is subjected to morphological analysis.

Figure 5:
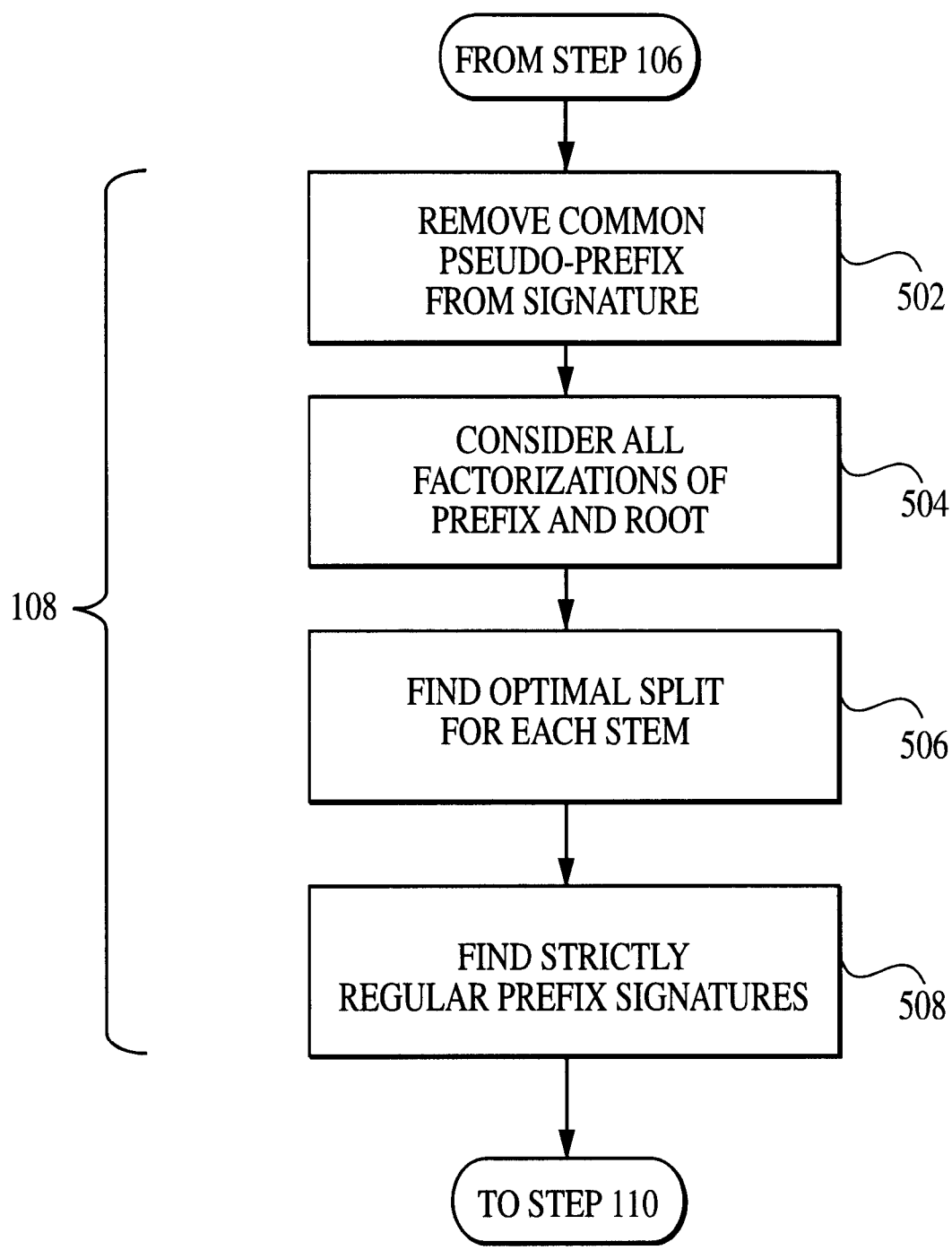

FIG. 5 illustrates method steps for handling cases such as these by identifying prefixes. This corresponds to step 108 (FIG. 1). At step 502, common pseudo-prefixes are removed from signatures. This is done by applying the following rules. Check each (regular) signature. If there is a common sequence of one or more letters which they commonly share, and which, if removed, turns the signature into another already existing signature, then that sequence of letters should be removed from the suffix and made part of the stem.

That is, all the words corresponding to the signatures in listed above will be re-split into stem and suffix. For example, in the case of ment.ments, this is the eight words "acquirement(s), entertainment(s), garment(s), arrangement (s)". "acquirement" (etc) will still be analyzed as acquirement, but acquirements will be split as acquirement-s, and there will be no signature ment.ments. In addition, the signature NULL.s will be enlarged, because it will now have four more words added to it. This reduces the number of from 439 to 412 in this particular 100,000 word corpus. On a successive application of the algorithm to the collection of stems, the structure arrange+ment can be identified if the word or stem arrange has appeared in this corpus.

The case of ments illustrates the case where a regular suffix has been identified that is the concatenation of two existing regular suffixes, and where there is no good reason to treat the concatenation of the two as a separate suffix. In the overwhelming majority of cases, the suffixes split up by that procedure are spurious multiple suffixes. It would be good to extend this splitting to other cases—that is, to all ments wherever they were found, whether they were in a signature with or without ment, and regardless of what other suffixes appeared in the signature. In the case of ments, this is no doubt correct, but there are a small number of cases where this would give poor results. The clearest case comes from German While the criterion of removing common pseudo-prefixes works correctly, it would be a serious error to generalize it to the simplistic conclusion that all of its modifications can be applied regardless of context. That is, if this criterion determines that a morpheme should be split in a particular signature, one cannot transfer that conclusion to other signatures without risk of serious error.

Returning to the analysis of English, let us look at a sample of signatures in which all components share a number of common letters. The first 12 found in the Brown corpus are given in Table 5, by way of example. Three of the 12 can be eliminated as distinct signatures by removing that initial material (which is me in one case, t in the other two), for the modified signature is independently motivated in the language. For example, the signature .me.med. can be simplified to NULL.d., which is independently motivated in the language (in this case, only one stem was involved: infla, which is then changed to inflame). Of the 518 signatures in the Brown Corpus, 189 were eliminated by this procedure.

TABLE 5

12 of 518 signatures in Brown Corpus whose suffixes share initial material.

| | |
|---|---|
| .t.te.ted.ts.ty. | Shortened signature not found |
| .ion.ions.ively. | Shortened signature not found |
| .te.ted.ter.tion. | Shortened signature not found |
| .me.med. | Shift accomplished: .NULL.d. |
| .ial.ified. | Shortened signature not found |
| .t.ter.ts.ty. | Shortened signature not found |
| .al.ally.ate. | Shortened signature not found |
| .able.ably.ant. | Shortened signature not found |
| .able.ation. | Shortened signature not found |
| .is.ized. | Shortened signature not found |
| .t.tic. | Shift accomplished: .NULL.ic. |
| .t.ted.ts.ty. | Shift accomplished: .NULL.ed.s.y. |

To summarize, then: step 502 of removing common pseudo-prefixes allows simplification of the signature collection in a significant measure. While its effects are far from complete, the remaining bad signatures are statistically quite minor.

Prefixes in stems-and-suffix languages are virtually all derivational affixes, though unclear cases certainly exist (such as the separable prefixes in Dutch and German, which are arguably distinct syntactic elements). The algorithm described above in conjunction with FIG. 3 to identify suffixes will work quite satisfactorily when applied enantiomorphically. In practical terms, this means that we take the set of stems which we have computed, and consider all possible factorizations into prefix and root, step 504 FIG. 5. Using the figure of merit discussed above (sum of |W| log [W] for W={prefix, root}), we find the optimal split for each stem, step 506. We then determine the set of prefixes that appear with each root so defined, and define the strictly regular prefix signatures as those sets of prefixes which have more than one prefix, and which appear with more than one root, step 508. If a prefix appears on a certain form, and that form appear as a free-standing stem (e.g., out- and -hit, as in the verb outhit), then the prefix signature in question is NULL.out, and it has two members. If such a prefix signature is found on two or more roots, then it is strictly regular, and the prefixes in it are regular prefixes in the language. In general, the results are what a human would be expected to produce upon linguistic analysis.

A 100K corpus of English produces the list of prefixal signatures in Table 10.

TABLE 10

Prefixes in English

| | |
|---|---|
| .NULL.re. | 8 |
| .NULL.dis. | 7 |
| .NULL.de. | 4 |
| .NULL.un. | 4 |
| .NULL.con. | 3 |
| .NULL.en. | 3 |
| .NULL.al. | 3 |
| .NULL.t. | 3 |
| .NULL.con.ex. | 2 |
| .dr.th. | 2 |
| .NULL.be. | 2 |
| .NULL.com. | 2 |
| .de.re. | 2 |
| .o.su. | 2 |

These prefix identifications are for the most part unexceptionable and correct: re-, dis-, de-, un-, con-, en-, al-, ex-, be-, com-, re- require no further discussion. They are correct identifications from a human point of view. Looking at the other three: t-, dr-, th-, o-, su-. t is motivated by the stems: ru/tru (ru is found in such words as rue, rued, ruin, and run; tru is found in true, truth, other related words, and trust), wo- (as in wo-man) and two (an unanalyzed word, hence a stem), as well as reason/treason. The prefixes dr and th both appear with the stems ank and ink (drank, drink, thank, think), and o/su are motivated by the prefix-stem combinations object, subject, oppose, suppose).

By setting the threshold for acceptance a little bit higher—requiring five stems, for example, as noted above to be associated with a particular prefix-signature—increases the accuracy considerably, eliminating virtually all spurious results. In addition, prefixes have been selected on the basis of the stems analyzed in the corpus, rather than the words. As the spurious examples from English suggest, this is in some regards too permissive a strategy. If a high cost is put on incorrectly identifying a prefix, it may be preferable to determine prefixes on the basis of the words of the corpus rather than the stems that have been inferred.

Figure 6:
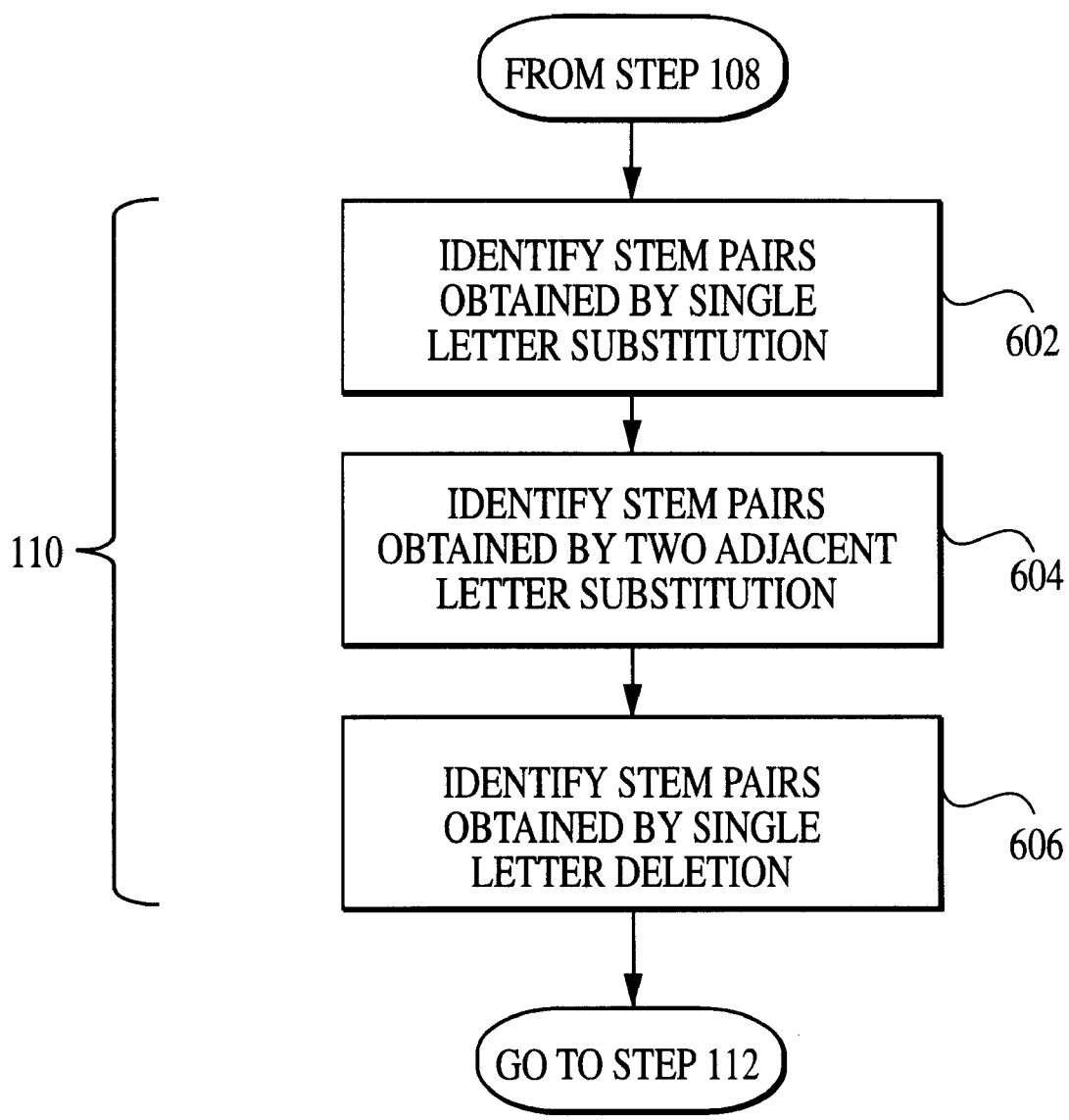

FIG. 6 illustrates in further detail step 110 of FIG. 1 for finding irregular stems. The following procedure is illustrated in FIG. 6.

The system considers all pairs of stems that have emerged from the process described so far. The system identifies all pairs in which one stem can be obtained from the other by one of three processes. First, the method identifies stem pairs which differ by substitution of one letter for another, step 602. Second, the method identifies stem pairs which differ by substitution of two adjacent letters for another, step 604. And third, the method identifies stem pairs which differ by deletion of a single letter, step 606.

For each such pair identified, two entries are made in a list in a format that simulates a familiar phonological rule: for the French pair menac and mena.ç, for example, the system generates the string c:ç/__# and the string c:ç/a__. This notation is intended to indicate that there is a pair of stems which are identical except that one has c where the other has ç, and to the right of the slash is an indication of the environment in which this difference occurs. The method also eliminates from consideration any two stems which appear with the same suffix, on the grounds that two allomorphs of the same stem will not appear with the same overt suffix.

This list of rules that we have generated is then sorted, and those stem pairs with more than 5 occurrences are considered. But in addition, in counting number of occurrences of a rule, we consider only pairs of stems where both of the stems in question are at least five letters long. Among shorter stems, there are far too many spurious, fortuitous connections, as between, for example, the stems a and be, which could be represented by the rules a:be/#__ and a:be/__#.

The logic of this situation is more important than the specific assumptions made in the previous paragraph about how the rules are formulated. The logic is this: how can we hope to find "irregularly" related morphemes in an unknown language? The first step is to begin with a very simple assumption about the nature of possible relations between stems. A working hypothesis here is that deletion and "mutation" of segments is common, but other logical possibilities, such as the possibility that related morphemes are mirror-images of each other, are not allowed into our universe of hypotheses. The universe of possible pair-wise relationships is examined. The method asks what pairings reoccur significantly. In the entire set of stems generated from the Brown corpus, there are 11,304 distinct "rules" that are potentially identified, though well over 99.9% are of no interest whatsoever (the last one on the list is the hypothesis that ke alternates with g after o, as in the single pair yoke/yog—yog is a stem that is (correctly) identified in the pair of words yoga and yogi).

What is it that determines "interest"? At this point in the analysis, the answer is pure quantitative extent. A distance measure is induced between two stems in the following way. For any pair of stems S1 and S2 in a given large corpus, the method asks what rule relates the two (call that rule R (S1, S2)), and further asks how many pairs of stems that rule relates in the corpus: Extent (R (S1, s2)). The distance between S1 and S2 can then be sensibly defined as 1/(1+ Extent (R(S1, S2))); or more generally, any monotonically increasing function F may be used for which F(0) is strictly positive (let us say, 1): distance (S1, S2)=1/F (Extent (R(S1, S2))).

For example, In the case of adverse/advers, the rule is :e/__#, and the rule "occurs" 215 times, in the sense that there are 215 distinct pairs of stems related by that rule. The distance between adverse and advers is then 1/(1+215)= 0.00463, while the distance between two arbitrary stems (boy and girl, for example!)=1/(1+0)=1. The distance between yog and yoke is 1/(1+1)=0.5. It should be clear that this measure reflects the good common sense that two forms are closer to one another if and only if the formal relationship between them is manifested in a wide-spread fashion throughout its language.

From the foregoing, it can be seen that the present embodiments provide a new system and method for automatic and unsupervised morphological analysis of a corpus of natural language. The method and apparatus determine the prefixes, suffixes and stems of the language in question, along with regular patters of suffixation. In addition, they determine the major patterns of stem allomorphy. The embodiment performs unsupervised learning in that the sole input is a large corpus of language. No dictionary and no morphological rules specific to any particular language are needed.

While a particular embodiment of the present invention has been shown and described, modifications may be made. It is therefore intended in the appended claims to cover all such changes and modifications which follow in the true spirit and scope of the invention.

What is claimed is:

1. A method for determining a morphology of a language, the method comprising:

(a) finding an optimal division of each word of a plurality of words to form stems and suffixes, including dividing each word into all possible combinations, each combination having two elements;

for each possible combination, storing a candidate stem and a candidate suffix; and for each candidate stem and each candidate suffix, assigning a figure of merit value related to number of occurrences of the candidate stem and the candidate suffix in the plurality of words;

selecting a division having optimal figure of merit value as the optimal division;

(b) forming combinations of the stems and the suffixes as signatures; and (c) producing the morphology of the language using the signatures.

2. A method for determining the morphology of a natural language, the method comprising the steps of:

(a) receiving a corpus including a plurality of words of the natural language;

(b) identifying a parse of a word including a candidate stem and a candidate suffix;

(c) determining a quality of the parse according to the relation V(Stem/Suffix)=|Stem|* log [Stem]+|Suffix|* log [Suffix];

(d) selecting the parse having best quality according to a predetermined criterion;

(e) repeating steps (b) through (d) for all words of the corpus;

(f) combining stems and suffixes to form signatures; and (g) producing the morphology of the language using the signatures.

3. The method of claim 2 further comprising the step of:

evaluating all possible parses of each word in the corpus.

4. The method of claim 2 wherein step (f) comprises steps of:

(f1) discarding all signatures associated with only one stem; and (f2) discarding all signatures associated with only one suffix.

5. The method of claim 2 wherein step (f) comprises the step of:

(f1) forming a list of each stem and all suffixes appearing with the each stem in the corpus.

6. The method of claim 5, wherein step (f) further comprises steps of:

(f2) establishing a data structure for each signature; and (f3) storing in the data structure all stems associated with that signature.

* * * * *